April 16, 1957   G. D. JOHNSON ET AL   2,788,887
COLLET MEANS FOR TURNING LONG WORKPIECES
Filed July 12, 1954   2 Sheets-Sheet 1

GLENN D. JOHNSON
WILLIAM J. WILLIAMS
INVENTORS

BY

ATTORNEY

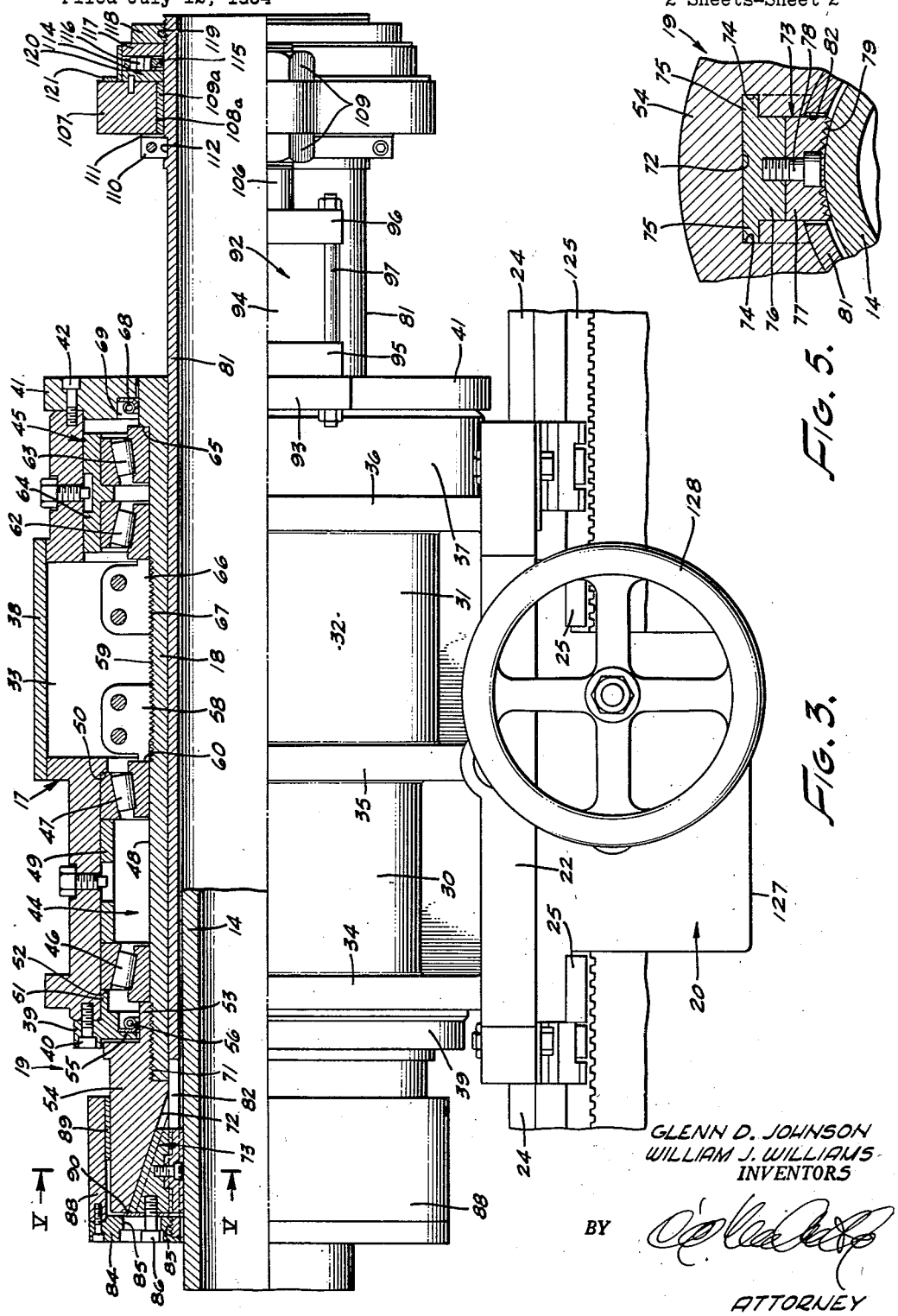

United States Patent Office 2,788,887
Patented Apr. 16, 1957

2,788,887

COLLET MEANS FOR TURNING LONG WORKPIECES

Glenn D. Johnson, Compton, and William J. Williams, Los Angeles, Calif., assignors, by mesne assignments, to Joy Manufacturing Company, Pittsburgh, Pa., a corporation of Pennsylvania Application July 12, 1954, Serial No. 442,582

5 Claims. (Cl. 203—115)

This invention relates to a high-speed turning lathe machine for turning relatively long workpieces which have a length exceeding the maximum length normally accommodated by the machine. More particularly, the invention relates to a novel construction of a hollow tailstock and collet means for holding a workpiece in initial position for turning of a subportion thereof for passing the turned portion of the workpiece therethrough and for moving an adjacent unturned portion of the workpiece into position for turning.

Prior turning lathe machines for long bars have been constructed with a relatively great space between the headstock and the tailstock of such machines. A long bar being turned on such a prior machine could be cut for approximately one half its length. The partially turned bar was then removed from the machine, turned around, and the unturned portion positioned in the machine for cutting. Obviously reversing such long bars was time consuming, required careful repositioning and recentering of the workpiece in the machine, and often introduced inaccuracies. Because of the time required in repositioning such a long workpiece, set-up time for the machine was slow. Such prior proposed machines also utilized well-known centering means in the tailstock. During turning of the bar, heat and expansion thereof against such usual centering means required frequent adjustment of the machine in order to compensate for expansion in order to accurately turn the workpiece about a predetermined and pre-established axis.

This invention contemplates a high-speed turning lathe machine for handling long workpieces to be turned wherein the machine need not be of great length and wherein the workpiece is not removed and reversed for completing the turning thereof. The machine of this invention contemplates a hollow tailstock which is longitudinally movable along a machine bed and which is provided with collet means for releasably holding and grasping a workpiece to be turned. An end portion of a workpiece positioned between the headstock and the tailstock may be first turned and cut therebetween by a suitable cutting tool. The collet means is then actuated to release its grasp on the workpiece and the tailstock is rapidly moved virtually the length of the machine bed to a position adjacent the headstock. During this movement the turned and cut end portion of the workpiece is slidably supported and passed through the collet means of the hollow tailstock. Adjacent the headstock the collet means regrasps the workpiece. The tailstock is then returned to its normal initial position, pulling the workpiece through the hollow headstock, the chuck means of which have been released. The adjacent uncut intermediate or subportion of the workpiece is thus positioned for cutting and turning. Successive cutting and advancing of the workpiece is repeated until selected portions of the workpiece are turned and cut as desired. The collet jaws of the collet means which releasably grasp the workpiece are designed to accurately center the workpiece at each grasping thereof and to automatically accommodate heat and expansion of the workpiece during turning and cutting so that changes in the workpiece are automatically compensated for and accurate centering about a selected axis is maintained.

It is therefore the primary object of this invention to disclose and provide a high-speed turning lathe machine provided with a novel hollow tailstock and collet means.

An object of this invention is to disclose and provide a turning machine of relatively short length as compared to the workpiece to be turned.

Another object of this invention is to disclose and provide a novel lathe machine wherein a longitudinally movable tailstock is provided for centering a workpiece and for successively positioning the workpiece longitudinally of the machine.

A further object of this invention is to disclose and provide a tailstock constructed and arranged for releasably grasping a workpiece and for relative longitudinal sliding movement with respect to the workpiece.

A still further object of this invention is to disclose and provide a novel tailstock wherein collet means are provided for grasping a workpiece in such a manner that the workpiece is accurately centered at all times during the turning operation and changes in the workpiece, due to expansion from heating of the metal thereof, are automatically compensated.

These and other objects and advantages of this invention will be readily apparent from the following description of the drawings in which an exemplary embodiment of this invention is illustrated.

In the drawings:

Fig. 3 is a side view of a tailstock embodying this invention partly in section, the section being taken in the planes indicated by line III—III of Fig. 2.

Fig. 5 is a fragmentary enlarged sectional view taken in a transverse plane indicated by line V—V of Fig. 3.

Figure 1:
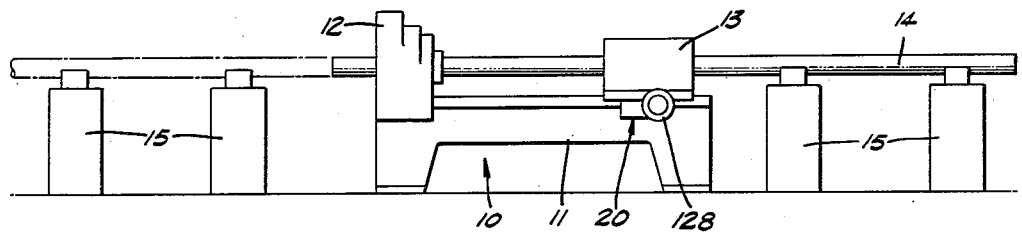
Fig. 1 is a diagrammatic view of a lathe machine embodying this invention and a workpiece supported in relation thereto.
Figure 2:
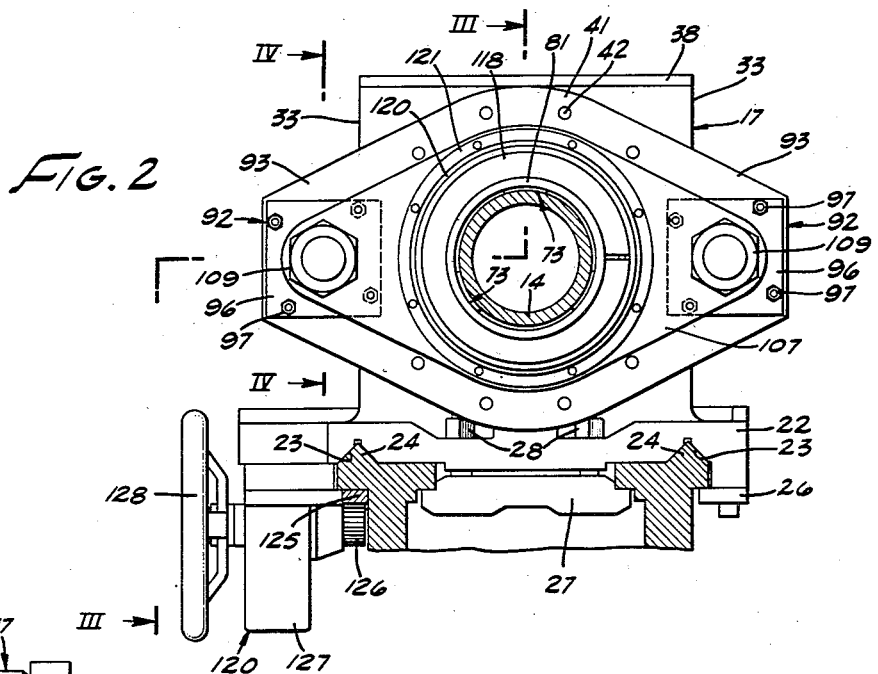
Fig. 2 is an end view, partly in section, taken from the right of Fig. 1.
Figure 4:
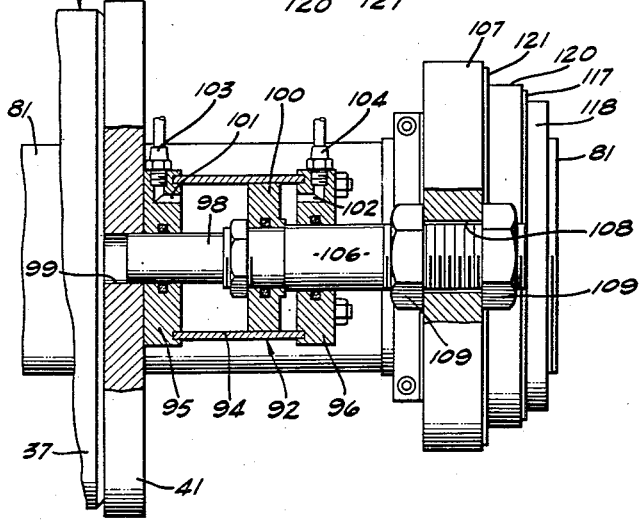
Fig. 4 is a fragmentary sectional view taken in the vertical plane indicated by line IV—IV of Fig. 2.

In Fig. 1 a high-speed turning lathe machine 10 embodying this invention is diagrammatically illustrated and includes a machine bed 11 upon which may be mounted a fixed hollow headstock 12, a movable hollow tailstock 13 and a tool-supporting means, not shown, movable between the headstock and tailstock for cutting a workpiece 14. The workpiece 14 may be supported along its length beyond opposite ends of the machine 10 by suitably spaced steady rests 15.

The headstock 12 is not described in detail. It may include any well-known form of hollow headstock provided with chuck means for grasping a workpiece and means for rotating a workpiece. The headstock 12 should be of the type which permits the workpiece to be moved longitudinally therethrough.

The tailstock 13 generally comprises a housing 17 (Fig. 3) within which is rotatably mounted a spindle 18 carrying a collet means generally indicated at 19, and traversing means 20 for moving the tailstock longitudinally of the machine bed 11. The support and mounting of the tailstock 13 upon the machine bed may include a horizontally disposed base or carriage member 22 integral with said housing 17. The carriage member 22 may be provided with spaced parallel longitudinally extending, downwardly facing inverted V grooves 23 for cooperable sliding engagement with corresponding longitudinal way means 24 provided on the machine bed 11.

The tailstock 13 is held against relative turning movement on the machine bed by means of front and back outboard keeper plates 25 and 26 which extend beneath outboard edge margins of the way means 24 for slidable engagement therewith. Between the way elements 24 the member 22 carries longitudinally spaced, transversely extending inboard keeper members 27 which cooperably slidably engage inboard downwardly facing margins of the way means 24. The inboard keeper elements 27 may be secured to carriage member 22 by suitable bolt and nut assemblies 28. The tailstock is thus slidably mounted upon the machine bed and held against rotation.

The housing 17 may be of any suitable configuration adapted to rotatably mount therewithin the hollow spindle 18. In this example, housing 17 may comprise a forward cylindrical portion 30, an intermediate portion 31 having a bottom semi-cylindrical section 32 terminating in vertical upper side walls 33. The housing portions 30 and 31 may be defined by vertical external transverse reinforcing wall ribs 34, 35 and 36 which extend downwardly to and integrally merge with carriage member 22. A rearmost housing portion 37 may be of enlarged cylindrical form.

A removable flat top cover plate 38 may seat on top edges of side walls 33 of the intermediate housing portion 31 to provide access into said intermediate portion. A front annular cover plate 39 may be secured to the front housing portion 30 as by suitable counter-sunk spaced stud bolts 40. A rear annular cover plate 41 may be secured to the rearmost housing portion 37 as by spaced stud bolts 42.

Means for rotatably mounting hollow spindle 18 within housing 17 may comprise front and rear antifriction means 44 and 45 respectively. The front antifriction means 44 may comprise longitudinally spaced tapered bearing means 46 and 47, each seated on a bearing surface 48 provided on spindle 18. Between the bearing means 46 and 47 is provided a bearing spacer sleeve 49 for positioning the outer race of the bearing means 47 against a forwardly facing internal shoulder 50 provided on the housing portion 30. The outer races of the bearing means 46 and 47 are positioned by an internal cylindrical extension 51 provided on front cover plate 39, said extension 51 projecting into the housing portion 30 for abutment as at 52 with the outer race of bearing means 46.

The inner race of the bearing means 46 is positioned by a rearwardly directed cylindrical portion 53 provided on a forwardly extending collet body member 54. The front antifriction means may be suitably sealed by a radially inwardly extending internal flange 55 on the front cover plate 39 which extends into close proximity with cylindrical portion 53. A suitable resilient sealing closure 56 is carried within the front cover palte 39 adjacent to the flange 55.

Means for adjustably positioning the inner race of bearing means 47 may be provided by a bearing adjusting nut 58 which is provided threaded engagement with a central externally threaded portion 59 on the spindle 18. The adjusting nut 58 is provided with an annular shoulder for abutment as at 60 with the inner race of the bearing means 47.

The rear antifriction means 45 includes tapered bearing means 62 and 63. The outer races of said bearing means are in abutment with and spaced apart by a central radially inwardly directed flange on a bearing sleeve 64 mounted within the rearmost housing portion 39. The inner race of bearing means 63 may abut against a forwardly directed external annular shoulder 65 provided adjacent the end of spindle 18. The inner race of bearing means 62 may be positioned by a bearing adjustment nut 66 threaded as at 67 on the central threaded portion 59 of the spindle. The rear bearing means 45 is provided a bearing seal by a resilient closure 68 positioned within an annular recess 69 provided on the rear cover plate 41.

While a specific antifriction mounting of the spindle means 18 within the housing portion is illustrated and described, it will be readily understod that other suitable antifriction mounting means may be provided.

The collet means 19 includes the collet body member 54 of cylindrical form which may be provided with internal threads for threaded engagement as at 71 with external threads provided on the front end of spindle 18. Threading of the collet body 54 on the spindle 18 causes the extension 53 thereon to abut against and position the inner race of the bearing means 46. The collet body member 54 may be provided with a plurality of circumferentially spaced internal tapered recesses 72 opening to the front of body member 54 and adapted to slidably mount wedge-shaped collet jaw elements 73. Each recess 72 may include parallel side guide grooves 74 adapted to slidably receive guide flanges 75 on a jaw element 73. Each jaw element 73 may comprise a main body portion 76 having a tapered outer or top surface complementary to the inwardly tapered surface of recess 72. An inner wear portion or liner 77 may be secured to the main body portion 76 as by a securing bolt 78. The internal face of each liner 77 may include a plurality of serrations 79 to facilitate grasping of workpiece 14, said serrations being arranged in a curve generally complementary to the outer surface of the workpiece 14. It will be readily apparent that simultaneous longitudinal sliding movement of jaw elements 73 in tapered recesses 72 will cause the jaw elements to be urged, as by wedging, radially inwardly for tight grasping of a workpiece.

The collet means 19 includes means for moving or actuating said collet jaw elements 73. A collet jaw actuator sleeve member 81 is longitudinally slidably movable within spindle 18 and extends outwardly from opposite ends of the spindle 18 and housing 17. In the front end portion of actuator sleeve member 81, spaced circumferentially arranged longitudinal slots 82 may be provided, each to receive therewithin the radial inner portion of a collet jaw element 73. Each slot 82 extends longitudinally a sufficient distance to accommodate longitudinal movement of a jaw element 73.

At the front end of actuator sleeve member 81 an annular pressure plate 84 may be threadedly mounted thereon as by threaded engagement at 83. The pressure plate 84 may be provided with radially elongated counter-bored openings 85 adapted to slidably receive therewithin for radial movement a stud bolt 86 secured to the jaw element 73. Radial movement of bolt 86 occurs when jaw element 73 is moved longitudinally. Connected to outer circumferential margins of the pressure plate 84 is a guide sleeve ring 88 which extends rearwardly over the forward portion of the collet body member 54. A bearing sleeve 89 facilitates relative sliding movement between the guide ring 88 and the collet body member. Between the pressure plate 84 and the front face of each jaw 73 may be provided an annular spacer plate 90. It will thus be readily apparent that jaw elements 73 held by the collet body member 54 and connected to pressure plate 84 and to sleeve actuator member 81 may be urged into gripping engagement with a workpiece 14 upon longitudinal movement of the sleeve actuator member 81.

Means for moving the sleeve actuator member 81 longitudinally relative to the workpiece and to the spindle 18 may comprise a pair of fluid-pressure double-acting cylinder means 92 each carried at opposite sides of the member 81 beyond the rear of the housing 17. The pair of cylinder means 92 may be connected to the rear cover plate 41 which is extended laterally to provide side portions 93 serving as cylinder support means. Each cylinder means 92 may comprise a hollow cylinder 94 positioned between a ported base 95 and a ported head 96. The base 95 and head 96 are interconnected by a plurality of tie rods 97, said tie rods extending through the cylinder support portions 93 of the rear cover plate 41. A piston member 98 is carried axially of each cylinder 94 by the ported base 95 and head 96 and an aligned port 99 in the cylinder support portion 93. The piston member 98 carries a piston head 100 within the cylinder 94. The base 95 and the head 96 are provided with suitable fluid ports 101 and 102 to which suitable fittings 103 and 104 may be connected for introducing pressure fluid to either side of the piston head 100.

Each piston member 98 is provided with rearwardly extending enlarged portion 106 which may be connected to a laterally extending yoke 107 by passing portion 106 through opening 108 and securing by suitable spaced nuts 109. The yoke 107 is provided with a central port 108 which receives a bearing sleeve 109 for mounting the yoke on the end of the rotatable actuator member 81. The yoke 107 may be shaped similar to the rear cover plate 41 with cylinder support portion 93 and is of somewhat reduced size. The yoke 107 may be positioned by a back-up ring 110 having an annular bearing washer 111 interposed between the ring 110 and the opposed forward face of the yoke 107. The back-up ring 110 is positioned in a suitable annular groove 112 provided on the actuator member 81. Keyed to the rear face of the yoke member 107 may be a suitable stationary plate 114 providing a flat annular race way 115 for antifriction roll means 116 positioned between a rotatable annular plate 117 sleeved over the end of actuator member 81. The roll means 116 may be positioned by a thrust-adjusting nut 118 threaded on external threads as at 119 provided on the end of the actuator member 81. A shield for the roll means 116 may be provided by a sleeve ring 120 covering the stationary plate 114 and the rotatable plate 117. The sleeve ring 120 may be positioned by a retainer ring 121.

In Fig. 3 the collet actuator member 81 is positioned longitudinally rearwardly by the cylinder means 92 for causing the collet jaw 73 to tightly grasp the workpiece 14. In this position it will be noted that the piston head 100 is at the rear of cylinder 94 and the yoke 107 is spaced longitudinally from the rear of the housing 17. When it is desired to release workpiece 114, pressure fluid may be introduced through the port 102 to move the piston head 100 forwardly. Such movement of the piston heads 100 will cause the yoke 107 to move toward the housing 17. Since the yoke is connected to the sleeve actuator member 81 the sleeve actuator member is likewise moved forwardly with relation to the spindle 18. Such movement of the actuator member 81 causes collet jaw elements 73 to move forwardly and to be retracted out of gripping engagement with the workpiece 14. Such movement away from workpiece 14 is permitted by the radially elongated openings 85 provided in pressure plate 84. When the jaw elements 73 are disengaged from the workpiece 14, the workpiece is supported within the hollow actuator member 81 and is slidable therethrough.

Means for moving the tailstock 13 longitudinally of the machine bed 11 and upon the ways 24 may comprise a longitudinally extending rack bar 125 carried by the machine bed. A rack pinion 126 engages said rack bar for moving the tailstock longitudinally of the bed. Rack pinion 126 is connected to a suitable gear train generally indicated at 127 driven by a hand wheel 128. The gear train 127 is so designed that turning of the hand wheel 128 will rapidly move the tailstock longitudinally along the ways 24, the workpiece being slidably supported by the actuator member. It is understood other means may be used to longitudinally move the tailstock such as an independent power means.

When it is desired to turn and cut a long workpiece in lathe machine of this invention, such a workpiece may be first positioned on the steady rests 15 at the left side of Fig. 1, and adjacent to the headstock 12. The workpiece may be fed through the headstock 12 until its end portion is positioned within the sleeve actuator member 81 of the tailstock 13, said tailstock initially being positioned adjacent to the headstock 12 and the jaw elements retracted. Upon actuation of the cylinder means 92 the sleeve actuator member 81 is urged rearwardly and causes the collet jaw elements 73 to grasp and center the end of the workpiece 14 received therebetween. The tailstock may then be moved along the machine bed by turning hand wheel 128 until it reaches its normal operating position at the other end of the machine bed 11. The portion of the workpiece now located between the headstock and the tailstock may then be turned and cut by suitable tools (not shown).

When the cutting of the portion of the workpiece 14 positioned between the headstock and tailstock is completed, the collet means on the tailstock 13 may be actuated to release the grasp of the collet jaw elements 73 on the workpiece. After the collet jaws have been released, the tailstock 13 may be advanced toward the headstock by the hand wheel 128 while the workpiece is held stationary by the headstock. The turned and cut portion of the workpiece is thus passed partially through the tailstock. Adjacent the headstock the collet means may be again actuated to cause the collet jaw elements to regrasp the workpiece and again center the workpiece within the tailstock. The chuck means on the headstock is then released from its grip on the workpiece. The tailstock may then be returned to its normal operating position at the far end of the machine bed and in so doing the tailstock pulls the workpiece through the headstock 12. The intermediate or subportion of the workpiece now positioned between the headstock and tailstock may be now turned and cut. This method of turning and cutting a subportion of the workpiece, advancing the tailstock toward the headstock to regrasp the workpiece, pulling an unturned, uncut subportion of the workpiece into position between the headstock and tailstock is continued until selected portions or the entire workpiece is turned and cut.

It will thus be readily apparent that a workpiece of any length may be turned by the lathe machine of this invention without removing the workpiece from the machine and without being limited to the distance between the headstock and tailstock. Any length of workpiece may be accommodated by providing the required number of steady rests beyond ends of the machine.

It will be noted that in the embodiment described the collet jaws are provided with serrated faces for tightly gripping the workpiece. These faces may be smooth so that the workpiece may not only be axially centered but in the event longitudinal expansion of the workpiece occurs due to heating thereof, some longitudinal slippage of the workpiece will be permitted to compensate for and relieve such expansion. Such longitudinal slippage will reduce excessive thrust-bearing pressures on the head and tailstock and permit greater accuracy in turning and cutting of the workpiece.

While the exemplary embodiment shows the collet jaws at the end of the tailstock facing the headstock, it will be understood that the collet jaws may be positioned at the other end of the tailstock. In this latter position the tapered slidable engagement of the collet jaws with the collet body member will permit compensation for longitudinal expansion of the workpiece.

It will be understood by those skilled in the art that modifications and changes may be made in the embodiment described which come within the spirit of this invention. All such changes coming within the scope of the appended claims are embraced thereby.

We claim:

1. A collet means for supporting, grasping and passing therethrough a workpiece to be turned and cut comprising in combination: a non-rotatable housing; an open ended hollow spindle member rotatably mounted in said housing and provided with a collet body at one end; collet jaw elements including a hollow open ended collet actuating sleeve member axially slidable in said spindle member and provided with longitudinally extending slots at one end for recepetion of said jaw elements; an annular pressure plate carried by said one end of said actuating sleeve member and extending over the end face of said collet body; means interconnecting the pressure plate and each jaw element; and a guide ring slidably supported on said collet body and connected to said pressure plate.

2. A collet means as stated in claim 1 wherein said means interconnecting the pressure plate and each jaw element includes a radial slot provided in said pressure plate and bolt means etxending through said slot and connected to a jaw element.

3. Collet means for supporting, grasping and passing therethrough a workpiece to be turned and cut comprising in combination: a non-rotatable housing; a hollow spindle member rotatable in said housing and provided with a collet body at one end; collet jaw elements carried by said collet body for movement longitudinally and radially with respect to the axis of said spindle member; and means for actuating said jaw elements including an annular pressure plate guided on said collet body and connected to each jaw element, and a hollow collet actuating sleeve member coaxial with and slidably supported in said spindle member and provided with a connection to said pressure plate, said actuating sleeve member projecting beyond the opposite end of said spindle member, and power means connected to the projected end of said actuating sleeve member for moving said actuating sleeve member longitudinally.

4. In combination with a rotatable collet means for grasping a workpiece to be turned and cut: a rotatable collet body having an outer end with an end face; a plurality of jaw elements carried within said body and disposed at the outer end of said body; an antifrictionally mounted guide ring encircling said collet body at said end thereof; an annular pressure plate secured to said guide ring and positioned over the said end face of said collet body, said pressure plate having a connection to each jaw element; and means for moving said pressure plate to actuate said jaw elements including a sleeve member connected to said pressure plate and coaxially disposed and longitudinally movable in said collet body, said sleeve member being adapted to receive and pass therethrough a work piece.

5. A collet means as stated in claim 4 wherein said sleeve member includes longitudinally extending slots receiving said jaw elements.

References Cited in the file of this patent

UNITED STATES PATENTS

| | | |
|---|---|---|
| 490,863 | Conradson | Jan. 31, 1893 |
| 728,458 | Hanson | May 19, 1903 |
| 932,394 | Johnson | Aug. 24, 1909 |
| 1,168,063 | Derbyshire | Jan. 11, 1916 |
| 1,506,107 | Brophy | Aug. 26, 1924 |
| 2,030,562 | Guirl | Jan. 10, 1939 |
| 2,289,167 | Bannister | July 7, 1942 |
| 2,310,259 | Ruppel | Feb. 9, 1943 |
| 2,338,687 | Johnson | Jan. 4, 1944 |
| 2,427,322 | Darner | Sept. 9, 1947 |
| 2,619,174 | Neale | Nov. 25, 1952 |
| 2,726,090 | Williams | Dec. 6, 1955 |

FOREIGN PATENTS

| | | |
|---|---|---|
| 118,153 | Great Britain | Aug. 16, 1918 |